Oct. 13, 1970 A. MARZOCCHI ET AL 3,533,830

GLASS FIBER SIZE COMPOSITION AND PRODUCTS

Original Filed Oct. 11, 1965

INVENTORS
Alfred Marzocchi
Albert E. Tamosauskas
by Staelin & Overman
Att'ys 3,533,830

GLASS FIBER SIZE COMPOSITION AND PRODUCTS

Alfred Marzocchi, Cumberland, R.I., and Albert E. Tamosauskas, Backstone, Mass., assignors to Owens-Corning Fiberglas Corporation, a corporation of Delaware Continuation of application Ser. No. 494,654, Oct. 11, 1965. This application June 23, 1969, Ser. No. 856,869
Int. Cl. C03c *75/02;* C08g *37/20, 51/04*
U.S. Cl. 117—72 10 Claims

ABSTRACT OF THE DISCLOSURE

The improvement in the bonding relationship between an elastomeric material and a glass fiber reinforcement for the elastomeric material in which a bundle formed of a multiplicity of glass fibers is impregnated with a composition formulated of a resorcinol formaldehyde resin, a vinyl pyridine terpolymer rubber, a neoprene rubber, a butadiene rubber and carbon black before combining the bundle of glass fibers with the elastomeric material for reinforcement.

This application is a continuation of Ser. No. 494,654, filed Oct. 11, 1965, now abandoned.

This invention relates to fibrous reinforced elastomeric products and more particularly to the fabrication of products formed of elastomers reinforced with glass fibers such as in the manufacture of tires, drive belts, conveyor belts, and the like.

The properties sought to be secured in such tires and belts include (1) dimensional stability, (2) high tenacity, (3) high density, (4) good heat resistance, (5) good moisture resistance, (6) good aging resistance, (7) dynamic flexure resistance, (8) dynamic fatigue resistance, (9) adhesion to primary compounded stocks, and (10) low cost. No one fibrous system for use as a reinforcement in combination with elastomeric materials has satisfied all of these requirements. The organic fibers, such as cotton, rayon, nylon, and polyester fibers are lacking in dimensional stability, heat resistance and high density requirements. Wires formed of special alloy steels and other metals are lacking in dynamic flex resistance and in dynamic fatigue resistance. The fibrous system capable of satisfying more of these requirements than any other of the fibrous materials are glass fibers.

It is an object of this invention to produce and to provide a method for producing glass fibers in combination with elastomeric materials wherein maximum utilization can be made of the desirable properties of the glass fibers in the combination with such elastomeric materials in the manufacture of glass fibers reinforced elastomeric products such as tires, belts and the like.

More specifically, it is an object of this invention to produce and to provide a method for producing impregnated bundles of glass fibers for combination with elastomeric materials in the manufacture of glass fiber reinforced elastomeric products and it is a related object to produce a new and improved glass fiber bundle impregnating composition for use in the preparation of same.

Still more specifically, it is an object of this invention to produce a bundle of glass fibers impregnated with a composition having an elastomeric base which has good aging and storage stability, which has sufficiently low surface tack to enable the impregnated bundle of glass fibers to be processed into yarns, cords or fabrics for use as a reinforcement, and which is capable of a strong and permanent bond with such elastomers as nature rubber, butadiene-styrene, butadiene-styrene-natural rubber blends, neoprene, isoprene, nitrile compounded rubbers and the like in the manufacture of glass fiber reinforced elastomeric products.

These and other objects and advantages of this invention will hereinafter appear and for purposes of illustration, but not of limitation, an embodiment of the invention is shown in the accompanying drawing in which.

Figure 1:
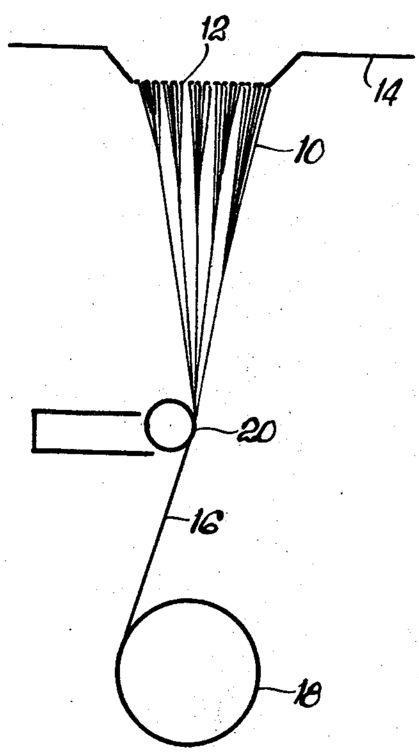
FIG. 1 is a schematic view showing the method for the forming of strands of continuous fibers.
Figure 3:
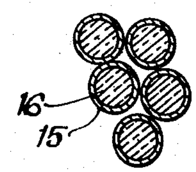
FIG. 3 is a sectional view of a fragmentary portion of a strand of size glass fibers.
Figure 4:
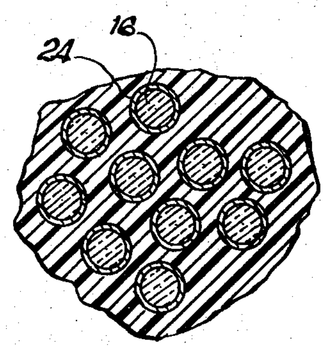
FIG. 4 is a cross-sectional view illustrating a fragmentary portion of the impregnated bundle of glass fibers.

As used herein, the term "bundles" of glass fibers is meant to include a multiplicity of glass fiber filaments gathered together in the form of a bundle, whether in the form of strands, yarns, cords, threads, or fabrics, and whether in the form of continuous fibers formed by the rapid attenuation of hundreds of streams of molten glass which are gathered together in yarn formation or discontinuous fibers formed by high pressure streams of steam or air directed angularly downwardly onto hundreds of streams of molten glass flowing gravitationally downwardly from the bottom side of a glass melting bushing and gathered together in yarn formation.

The term "elastomer" is meant to refer to the material forming the continuous phase in the cured or vulcanized elastomeric product intended to be reinforced with the impregnated bundles of glass fibers prepared in accordance with the practice of this invention and in which the elastomeric material may be represented by natural rubber, styrene-butadiene copolymer, styrene-butadiene natural rubber blends, neoprene, isoprene, nitrile compounded rubbers and the like.

To the present, glass fibers which have been added or otherwise incorporated with elastomeric materials in the form of continuous or chopped fibers have functioned more or less as a filler than as a reinforcement. As a result, little, if any, improvements in mechanical and physical properties have been made available from the combinations making use of such glass fibers in elastomeric products. It is believed that the failure to make fuller utilization of the desirable properties of the glass fiber components stems primarily from the inability properly integrate the glass fibers into the elastomeric system as by the establishment of a strong and permanent bonded relationship between the glass fiber surfaces and the elastomeric material or between the bundle of glass fibers and the elastomer.

Investigations have been conducted over the past several years by the most highly skilled in the art with the intent of achieving fuller utilization of the desirable properties of glass fibers when formulated into elastomeric materials in the endeavor to fabricate products having new and improved physical and mechanical properties. Substantial inroads are now being made as represented by the practice of this invention hereinafter to be described.

An important concept of this invention resides in the formulation of aqueous composition with which previously formed bundles of glass fibers can be impregnated for penetration into the interior of the glass fiber bundle to integrate the multiplicity of the glass fiber filaments making up the bundle; which is capable of development of a strong bonding relationship with the bundle of impregnated glass fibers; which operates to cushion the fibers in the bundle to permit relative movements between the fibers without destruction of the fibers by mutual abrasion, thereby to permit re-alignment of the fibers in the bundle for greater dynamic flex resistance and greater stress resistance; which has broad adhesion capabilities with the elastomer of the continuous phase so as to tie in the elastomer with the entire bundle of gloss fibers thereby to maximize utilization of the properties of the glass fibers; which is capable of cure or vulcanization with the continuous phase elastomer to minimize interfacial sepaartions whereby a substantial single phase system is formed in which the bundles of glass fibers are integrated as a dispered phase.

In accordance with the practice of this invention, the glass fibers are first processed into bundles of glass fibers as by the rapid attenuation of hundreds of strands 10 of molten glass issuing from orifices 12 at the bottom side of a glass melting furnace 14. Attenuation is effected by winding the glass fiber bundle or strand 16 about a rapidly rotating drum 18 after the multiplicity of glass fibers are gathered together at an applicator 20 by which an original size is applied to the gloss fiber surfaces. After the glass fibers have been processed into such strands or further procesed into yarns, cords, threads or fabrics and the like bundles, the bundles of glass fibers, with or without removal of the original size, are impregnated with a composition represented by the following example:

EXAMPLE 1

| Ingredients: | Amount in pounds |
|---|---|
| Water | 220 |
| Sodium hydroxide | 1 |
| Resorcinol formaldehyde resin (70% solids) | 22 |
| Formalin (37% $CH_2O$) | 15 |
| Ammonium hydroxide (28%) | 30 |
| Butadiene-styrene-vinyl pyridine terpolymer (Gentac—41% solids) | 250 |
| Anionic polychloroprene rubber latex (50% solids) | 415 |
| Butadiene rubber latex (60 solids) | 51 |
| Carbon black (20% solids) | 115 |

Figure 2:
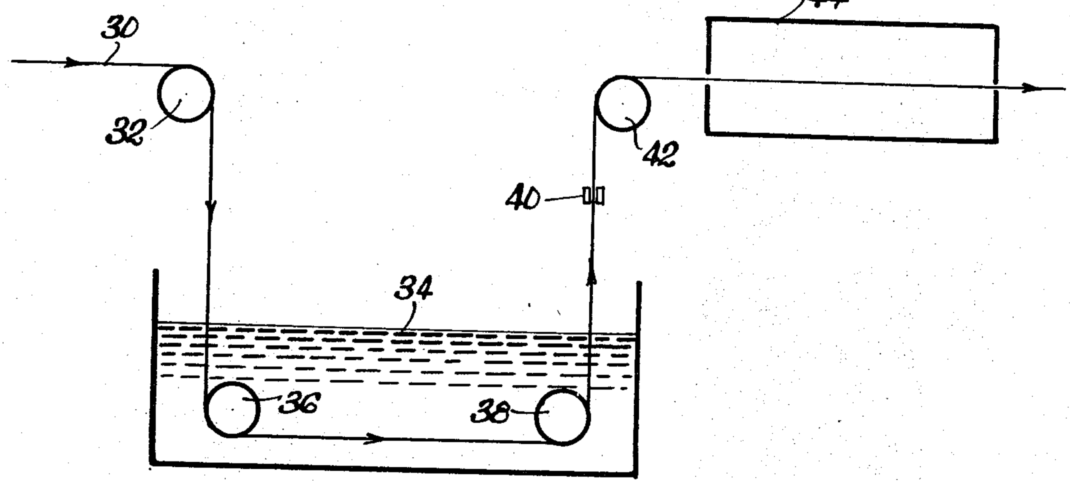
FIG. 2 is a schematic view showing one method for the impregnation of the glass fiber bundle with a composition embodying the features of this invention.

Impregnation with the aqueous composition of Example 1 can be made by way of a solvent bushing it also be achieved by immersion of the bundles of glass fibers in a bath of the aqueous impregnating composition. Referring more specifically to FIG. 2 of the drawings, the glass fiber bundle 30 is advanced over a guide roller 32 for passage downwardly into the bath 34 containing the impregnating composition of Example 1. The bundle is turned under the roller 36 to effect a sharp bend which operates to open the bundle and enable fuller penetration of the aqueous impregnating composition into the bundle of glass fibers for fuller impregnation of the bundle. The impregnated bundle is then turned upwardly about the idler roller 38 for passage upwardly out of the path and through a roller or die 40 which operates to wipe excess impregnating composition from the bundle and to work the impregnating composition into the bundle. Thereafter, the bundle is advanced over the roller 42 into and through a drying oven 44 preferably maintained at a temperature above ambient temperature, such as a temperature within the range of 200–750° F. to accelerate removal of the aqueous diluent and to set the impregnating solids in situ in the glass fiber bundle. Drying will occur in a relatively short period of time such as within 1–30 minutes, depending somewhat upon the temperature of drying.

The resorcinol formaldehyde resin comprises the condensation reaction product of resorcinol and formaldehyde in the molecular ratio of about 2 to 1.

The amount of the ingredients making up the impregnating composition may be varied within the following range:

EXAMPLE 2

| Material: | Parts by weight solids |
|---|---|
| Resorcinol formaldehyde resin solution (70% solids) | 1–6 |
| Butadiene-styrene-vinyl pyridine terpolymer (40% solids) | 15–40 |
| Anionic polychloroprene rubber latex (50% solids) | 30–60 |
| Butadiene-styrene rubber latex (60% solids) | 3–12 |
| Carbon black | 2–10 |
| Sodium hydroxide | .1–5 |

In the above formulation, Formalin (37% $CH_2O$) is added in an amount of .5–3.0 percent by weight based upon the dry gas $CH_2O$, and sodium hydroxide is preferably incorporated in an amount of .2–2.0 percent by weight in water solution.

The composition of Examples 1 or 2 is incorporated as an impregnant in the gloss fiber bundle in an amount to provide a solids of 5–25% by weight of the glass fiber system and preferably in an amount within the range of 10–15% by weight.

It is desirable to achieve as full impregnation as possible into the bundles of glass fibers in order more effectively to separate the fibers one from the other by the impregnating materials since the solids are effective as a coating on the fibers to cushion the fibers and to protect the fibers against destruction by mutual abrasion. For this purpose, it is desirable to achieve as deep penetration as possible into the gloss fiber bundle. The deeper the penetration, the more effective will be the bond between the bundle of glass fibers and the elastomeric material with which the glass fibers are combined in the manufacture of the glass fiber-elastomeric product.

In the final system, the elastomeric material will constitute a continuous phase which will include the materials with which the glass fiber bundles are impregnated while the glass fiber components will be integrated within the system as a dispersed phase. The continuous phase elastomer may be the same as a rubber of the type incorporated into the impregnating composition or the elastomeric material may differ therefrom as previously described. The continuous phase of elastomeric material can be employed in the cured or uncured state or in the vulcanized or unvulcanized state. It is believed that the tie-in between the impregnated bundle of glass fibers and the continuous phase of elastomeric material will occur primarily during cure or vulcanization in the fabrication or molding of the elastomeric product.

More complete protection for the individual glass fibers and a fuller integration of the glass fibers with the elastomeric material will be achieved when the impregnating compositions of Examples 1 and 2 are modified for use in application to the glass fibers in forming as a size applied as illustrated in FIG. 1 at the applicator 20 where the individual filaments of glass fibers are gathered together into the glass fiber strand. For this purpose, the impregnating composition of this invention is preferably formulated to include an anchoring agent such as gamma-aminopropyltriethoxy silane but such anchoring agent is not essential in the light of the compatability between the impregnating materials and the elastomeric material forming the continuous phase.

Instead of gamma-aminopropyltriethoxy silane, in the size or in the impregnating composition, use can be made of other organo silicon compounds in which the organic group attached to the silicon atom contains an amino group, such as gamma-aminovinyldiethoxy silane, into the glas fiber strand. For this purpose, the impreg-gamma(triethoxysilylpropylamide)propylamine, beta-aminoallyltriethoxy silane, para - aminophenoltriethoxy silane. The foregoing silanes, their hydrolysis products or their polymerization products may be employed or use can be made of other organo silicon compounds in the form of a silane, its hydrolysis product or polymerization product wherein the organic group permanently attached to the silicon atom contains an epoxy group, such as glycidoxypropyltrimethoxy silane, or 3,4-epoxycyclohexyltrimethoxy, silane, or in which the organic group contains a thio group. Instead of the organo silicon compounds, use can be made of a Werner complex compound in which the carboxylato group coordinated with the trivalent nuclear chromium atom contains an amino group, an expoxy group or a thio group such as amino-propylato chromic chloride, glycine chromic chloride, or glycylato chromic chloride. The following example represents a forming size which may be employed in coating the glass fibers in forming in accordance with the practice of this invention:

EXAMPLE 3

| Material: | Parts by weight solids |
|---|---|
| Resorcinol formaldehyde resin solution (70% solids) | 1–6 |
| Butadiene-styrene-vinyl pyridine terpolymer (Gentac —40% solids) | 15–40 |
| Anionic polychloroprene rubber latex (50% solids) | 30–60 |
| Butadiene-styrene rubber latex (60% solids) | 3–12 |
| Carbon black | 2–10 |
| Sodium hydroxide | .1–5 |
| Anchoring agent | .1–3.0 |

To the foregoing materials, water is added to form an aqueous dispersion in an amount to provide a solids content within the range of 5–20 percent by weight and ammonium hydroxide is incorporated in an amount within the range of 1–5 percent by weight and Formalin is added in an amount within the range of 1–4 percent by weight.

When the glass fibers are sized in forming with a composition embodying the modification of this invention, the sized fibers can be processed directly into yarns, strands, cords or fabrics and can be combined in such forms with the elastomeric material of the continuous phase without the need for impregnation of the fibrous bundle since the individual fibers of the bundle are already provided with a coating embodying the ingredients of the impregnating composition and which is compatible with the ealstomer material and capable of effecting strong integration between the fibrous bundle and the elastomeric materials forming the continuous phase in the final molded product.

In the fabrication of elastomeric products embodying the glass fiber bundles prepared in accordance with the practice of this invention, the glass fiber bundles embodying the compositions of Examples 1–3 are mixed with the elastomeric material or otherwise pre-arranged in the desired positions for combination with the elastomeric material as in the manufacture of glass fiber reinforced belts, or in the manufacture of rubber tires reinforced with cords of the glass fiber bundles. The combination of glass fibers and elastomeric material can thereafter be processed in a conventional manner by molding or cure under heat and compression or by vulcanization for advancement of the elastomeric material to a cured or vulcanized stage while in combination with the treated glass fibers whereby the bundles of glass fibers become strongly integrated with the elastomeric material in the glass fiber-elastomeric product.

The composition combined with the glass fibers by impregnation or by sizing provides an elastomer-compatible glass fiber system in that it is compatible with the elastomeric material used in the continuous phase in the molded elastomeric product whereby the compatible impregnating material blends with the material of the continuous phase completely to integrate the fibrous system into the molded product.

The carbon black serves the purpose of substantially completely masking or concealing the reinforcement by reason of the similarity between the color of the impregnated or coated fibers and the rubber stock with which the fibers are combined. The carbon black functions also in the system to improve the physical properties of the coating or impregnating material and to improve the aging characteristics of the reinforcing fibrous system thereby to improve the adhesion to the rubber stock.

The carbon black is capable of a function similar to that for which carbon black is incorporated into the elastomeric material for vulcanization or cure of the elastomer. Thus the carbon black in the impregnating composition does not in any way interfere with the cure of the elastomer but instead appears to enhance the resiliency of the impregnated bundle of glass fibers as well as its feel and lubricity while simultaneously imparting the foregoing characteristics. Instead of carbon black, use can be made of lamp black and other forms of finely divided carbon. While not equivalent to carbon black, the latter can be replaced in the foregoing examples with other finely divided compatible fillers such as mica dust, silica dust, chalk and the like.

In the foregoing impregnating and size compositions, the sodium hydroxide can benefically be replaced with quaternary ammonium hydroxides as represented by tetramethyl ammonium hydroxide, tetraethanol ammonium hydroxides, in amounts within the range of .1–5.0 percent by weight.

It will be understood that changes may be made in the details of the formulation, method of application and use without departing from the spirit of the invention, especially as defined in the following claims.

What is claimed is:

1. A glass fiber bundle, a thin size coating on the surface of the glass fibers in the bundle and an impregnant in the bundle of glass fibers in which the impregnant comprises the combination of resorcinol formaldehyde resin, butadione-styrene vinyl pridine terpolymer rubber, anionic polychloroprene rubber, carbon black and butadiene rubber, present in the ratio of 15–40 parts by weight vinyl pyridine rubber, 30–60 parts by weight polychloroprene rubber, 3–12 parts by weight butadiene rubber, 1–6 parts by weight resorcinol formaldehyde resin, and 2–10 parts by weight carbon black.

2. An elastomeric product comprising a continuous phase of elastomeric material and glass fiber bundles distributed throughout the continuous phase of the elastomeric material, in which the glass fiber bundles are impregnated with a composition to enhance their bonding relationship between the continuous phase of the elastomeric material and the glass fiber bundles in which the impregnant comprises the combination of resorcinol formaldehyde resin, butadiene-styrene vinyl pyridine terpolymer rubber, anionic polychoroprene rubber, carbon-black and butadiene rubber present in the ratio of 15–40 parts by weight vinyl pyridine rubber, 30–60 parts by weight polychloroprene rubber, 3–12 parts by weight butadiene rubber, 1–6 parts by weight resorcinol formaldehyde resin, and 2–10 parts by weight of carbon black.

3. Glass fibers and a size present as a thin coating on the glass fiber surfaces in which the size coating comprises the combination of a resorcinol formaldehyde resin, butadiene-styrene vinyl pyridine terpolymer rubber, anionic polychloroprene rubber, butadiene rubber, carbon black and an anchoring agent selected from the group consisting of an organo silicon compound and a Werner complex compound in which the organic group attached to the silicon atom of the organo silicon compound and in which the carboxylato group coordinated with the chromium atom of the Werner complex compound contain a group selected from the group consisting of an amine group and an epoxy group.

4. Sized glass fibers as claimed in claim 3 in which the materials are present in the ratio of 1–6 parts by weight resorcinol formaldehyde resin, 15–40 parts by weight butadiene-styrene vinyl pyridine terpolymer rubber, 30–60 parts by weight anionic polychloroprene rubber, 3–12 parts by weight butadiene rubber, 2–10 parts by weight of carbon black, and 0.1 to 3 parts by weight of the anchoring agent.

5. Sized glass fibers as claimed in claim 3 in which the anchoring agent is gamma-aminopropyltriethoxy silane.

6. An elastomeric product comprising an elastomeric material as a continuous phase and glass fibers distributed throughout the continuous phase in which the glass fibers have a thin size coating on the glass fiber surfaces to enhance the bonding relationship between the glass fibers and the elastomeric materials, said size coating comprising the combination of a resorcinol formaldehyde resin, butadiene-styrene vinyl pyridine terpolymer rubber, anionic polychloroprene, butadiene rubber, carbon black, and an anchoring agent selected from the group consisting of an organo silicon compound and a Werner complex compound in which the organic group attached to the silicon atom of the organo silicon compound and in which the carboxylato group coordinated with the chromium atom of the Werner complex compound contain a group selected from the group consisting of an amino group and an epoxy group.

7. An elastomeric product as claimed in claim 6 in which the materials are present in the thin size coating in the ratio of 1–6 parts by weight resorcinol formaldehyde resin, 15–40 parts by weight butadiene-styrene vinyl pyridine terpolymer rubber, 30–60 parts by weight anionic polychloroprene rubber, 3–12 parts by weight butadiene rubber, 2–10 parts by weight carbon black, and 0.1–3 parts by weight of the anchoring agent.

8. An elastomeric product as claimed in claim 6 in which the anchoring agent is gamma-aminopropyltriethoxy silane.

9. A composition for the treatment of glass fibers in filament and bundle form for use in the combination of glass fiber-elastomeric products consisting of an aqueous system containing 1–6 parts by weight of resorcinol formaldehyde resin, 1–6 parts by weight of Formalin, 2–10 parts by weight concentrated ammonium hydroxide, 15–40 parts by weight butadiene-styrene vinyl pyridine terpolymer rubber, 30–60 parts by weight anionic polychloroprene rubber, 3–12 parts by weight butadiene rubber, 2–10 parts by weight carbon black and 0.1–5 parts by weight of a quaternary ammonium hydroxide, the remainder being water.

10. A composition for sizing glass fibers to enhance their combination with elastomeric materials in the manufacture of glass fiber-elastomeric products consisting essentially of an aqueous composition containing 1–6 parts by weight resorcinol formaldehyde resin, 1–6 parts by weight Formalin, 2–10 parts by weight concentrated ammonium hydroxide, 15–40 parts by weight butadiene-styrene vinyl pyridine terpolymer rubber, 30–60 parts by weight anionic polychloroprene rubber, 3–12 parts by weight butadiene rubber, 2–10 parts by weight carbon black, 0.1–5 parts by weight of a quaternary ammonium hydroxide, and 0.1–3 parts by weight of an anchoring agent selected from the group consisting of an organo silicon compound and a Werner complex compound in which the organic group attached to the silicon atom of the organo silicon compound and in which the carboxylato group coordinated with the chromium atom of the Werner complex compound contains a group selected from the group consisting of an amino group and an epoxy group and in which the solids content of the size composition is within the range of 10–50 percent by weight, and in which the vinyl pyridine terpolymer rubber, the polychloroprene rubber and the butadiene rubber are present in the form of a latex.

References Cited

UNITED STATES PATENTS

| | | | |
|---|---|---|---|
| 2,481,879 | 9/1949 | Ross | 260—29.3 |
| 2,561,215 | 7/1951 | Mighton | 260—29.3 |
| 2,652,353 | 9/1953 | Wilson | 260—29.3 |
| 2,673,824 | 3/1954 | Biefeld et al. | 260—29.3 |
| 2,703,774 | 3/1955 | Morrison | 260—29.3 |
| 3,331,885 | 7/1967 | Rider et al. | 260—29.3 |
| 3,424,608 | 1/1969 | Marzocchi et al. | 260—29.3 |

JOHN C. BLEUTGE, Primary Examiner

U.S. Cl. X.R.

117—77, 126, 161, 163; 161—198, 203; 260—29.3, 38, 41.5, 845, 846, 890, 894